United States Patent
Buhl et al.

[11] Patent Number: 5,092,704
[45] Date of Patent: Mar. 3, 1992

[54] BALL JOINT WITH SEALING CUFF FOR MOTOR VEHICLES

[75] Inventors: Reinhard Buhl, Bohmte; Wolfgang Kleiner, Wagenfeld, both of Fed. Rep. of Germany

[73] Assignee: Lemforder Metallwaren AG, Lemforde, Fed. Rep. of Germany

[21] Appl. No.: 582,509

[22] Filed: Sep. 13, 1990

[30] Foreign Application Priority Data

Sep. 14, 1989 [DE] Fed. Rep. of Germany ....... 3930741

[51] Int. Cl.$^5$ ............................................. F16C 11/00
[52] U.S. Cl. ..................................... 403/134; 403/51; 277/212 FB
[58] Field of Search ................ 204/148, 197; 403/138, 403/50, 134, 51; 277/212 FB

[56] References Cited

U.S. PATENT DOCUMENTS

| | | | |
|---|---|---|---|
| 2,397,464 | 4/1946 | Booth | 403/138 X |
| 3,322,445 | 5/1967 | Hassan | 403/51 |
| 3,343,855 | 9/1967 | Husen | 403/51 |
| 3,343,857 | 9/1967 | Cislo | 403/51 X |
| 3,574,080 | 4/1971 | Jones et al. | 204/148 X |
| 4,146,448 | 3/1979 | Nakano et al. | 204/148 |
| 4,190,512 | 2/1980 | Wyatt et al. | 204/148 X |
| 4,510,032 | 4/1985 | Timmington | 204/197 |
| 4,692,231 | 9/1987 | St. Onge | 204/148 X |
| 4,623,433 | 11/1986 | Streichenberger | 204/1.11 |

FOREIGN PATENT DOCUMENTS 3705847 9/1988 Fed. Rep. of Germany .
465971 10/1967 Switzerland .
1477649 6/1977 United Kingdom .

Primary Examiner—Andrew V. Kundrat
Attorney, Agent, or Firm—McGlew & Tuttle

[57] ABSTRACT

To improve the corrosion protection at the connection site of the sealing cuff and the ball pivot, it is proposed, in a design in which the sealing cuff engages with an edge profile in a complementary profile of a retaining ring rigidly attached to the ball pivot, that at least the part (12) of the retaining ring (10) which is supported by the edge of the bearing lug (6) consists of a material whose value in the electrochemical series is lower than that of the material of the bearing lug (6) and of the ball pivot (2). By this construction the material of the retaining ring acts as an electrolytic sacrificial anode.

8 Claims, 2 Drawing Sheets

BALL JOINT WITH SEALING CUFF FOR MOTOR VEHICLES

FIELD OF THE INVENTION

The present invention pertains to a ball joint for motor vehicles, which has a sealing cuff formed of elastically deformable material, and more particularly to a ball joint wherein one end of the sealing cuff is fastened to the circumference of a housing and the other end of the sealing cuff rotatably engages with an edge profile and a complimentary profile of a retaining ring rigidly arranged on a ball pivot and is supported by the edge of a bearing lug in which the ball pivot is fastened.

BACKGROUND OF THE INVENTION

Designing the connection of the end of the sealing cuff which is the outer end relative to the housing of the ball joint with the ball pivot is problematic, because both radial and axial sealing between the ball pivot and the housing must be achieved despite the deflecting movement and the rotary movement of the ball pivot relative to the housing.

In prior-art designs, the sealing cuff has at this end an edge profile in the form of a bead-like thickened area with an inner bearing surface, which is in direct contact with the generated surface of the ball pivot or with a retaining ring firmly attached to the ball pivot. The sealing cuff may be held on the surface of the ball pivot by the intrinsic tension of the material or by the tension of a spring ring mounted externally. Circular tongue-and-groove designs have been known to ensure the axial position. Imperfect sealing of the radial sealing seat and also of the axial sealing seat very easily lead to corrosion on the vehicle part containing the bearing lug for fastening the ball pivot and on the ball pivot itself. Thus, the service life of a ball joint depends essentially on the extent to which it is possible to avoid corrosion in this area.

It is known from West German Patent No. DE-PS 37,05,847 that the edge profile of the sealing cuff on the ball pivot can be inserted into a retaining ring arranged on and adhering to the ball pivot. The retaining ring is provided with a coating of an elastic material on the mounting surface and on the support surface with which it is supported on a vehicle part.

It is known from British Patent No. GB-PS 1,477,649 that one end of the sealing cuff made of an elastically deformable material can be fastened in an annular groove provided on the circumference of the housing, and a profile of the other end, which is positive-locking in this axial direction, can be inserted into a circumferential recess of a support ring arranged on and adhering to the ball pivot. This support ring has a bearing surface sealingly surrounding the ball pivot, as well as a support surface that is radial thereto, which is supported by the vehicle part containing the bearing lug for fastening the ball pivot. The sealing cuff with its seating surface is thus able to be temporarily lifted off from the support ring in order to enable air and excess grease to escape from the inner space of the sealing cuff. However, this measure is not directed toward corrosion protection.

Finally, it was proposed in Swiss Patent No. CH-PS 465,971 that the support ring, as is known from West German Patent No. DE-PS 37,05,847, be made of a hard plastic which is rotatably surrounded by the bead of the sealing cuff, so that the sliding surface between the bead of the sealing cuff and the support ring is arranged in a protected depressed area.

SUMMARY AND OBJECTS OF THE INVENTION

It is an object of the present invention to provide the most inexpensive connection possible between the outer end of the sealing cuff and the ball pivot, where the connection is practically completely insensitive to corrosion.

According to the invention, a ball joint for motor vehicles is provided comprising a housing having an outer circumference with a joint ball positioned in the housing. The joint ball is provided with a ball pivot extending outwardly therefrom. The joint ball may be positioned in a joint cup disposed between the housing and the joint ball. A bearing lug is provided in which the ball pivot is fastened. A retaining ring is rigidly arranged on the ball pivot and is supported by the edge of the bearing lug. A sealing cuff is provided made of elastically deformable material. One end of the sealing cuff is fastened to the circumference of the housing and the other end of the sealing cuff includes an edge profile positioned in a complimentary profile of the retaining ring. At least the portion of the retaining ring which is supported by the edge of the bearing lug comprises a material which is electrochemically more reactive than the material forming the bearing lug and the material forming the ball pivot such that the material of the retaining ring acts as an electrolytic sacrificial anode.

What is achieved through this design is cathodic protection of the supporting parts of the motor vehicle, especially of the bearing lug receiving the ball pivot and of the ball pivot itself on the basis of conventional electrolysis, in which the retaining ring forms the sacrificial anode being dissolved. The bearing lug and the surrounding moisture form the electrolyte. Especially salt water, which normally promotes corrosion, acts as an electrolyte enhancing the cathodic protective effect. The material of the retaining ring or at least of the part supported by the edge of the bearing lug is selected on the basis of knowledge of the electrochemical series or chemical reactivity of materials. Zinc is mainly suitable in this case as well. This material is widely used in passive cathodic protective devices operating on the basis of the electrolytic principle.

In a preferred embodiment of the present invention, the retaining ring has an L-shaped cross section, and the radially extending leg of the retaining ring, which also forms the support surface that touches the edge of the bearing lug, has a cross section increasing in the inward direction. As a result of this, the height of the cross section of the ring to be decomposed and consequently the decomposed volume change with increasing path of decomposition from the outside to the inside, so that prolongation of the decomposition time is achieved.

As a variant of the design according to the present invention, in an area forming the support surface, a retaining ring may be firmly attached to a coating consisting of a material which is more chemically reactive than the material of the bearing lug and the ball pivot.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DETAILED DESCRIPTION OF THE PREFERRED EMBODIMENT

Figure 1:
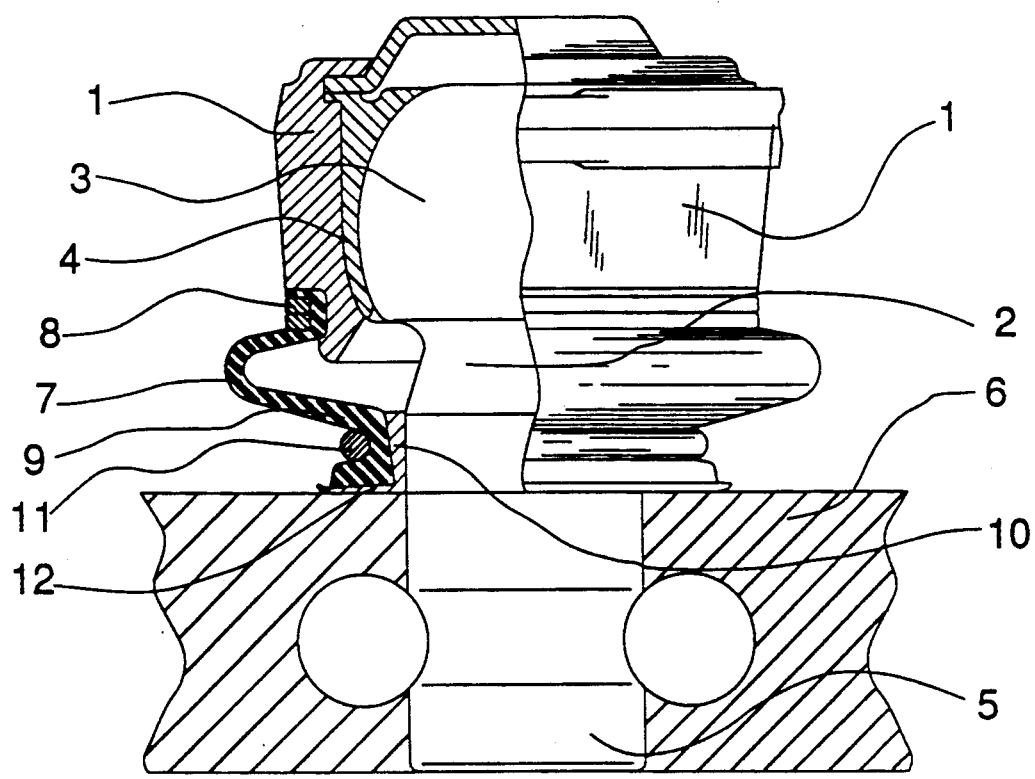
FIG. 1 is a view of a ball joint partly as a side view and partly as a section through an axial plane of the ball pivot: and, FIG. 2 is an enlarged cross sectional view through the retaining ring and of the edge profile engaged in it.
Figure 2:
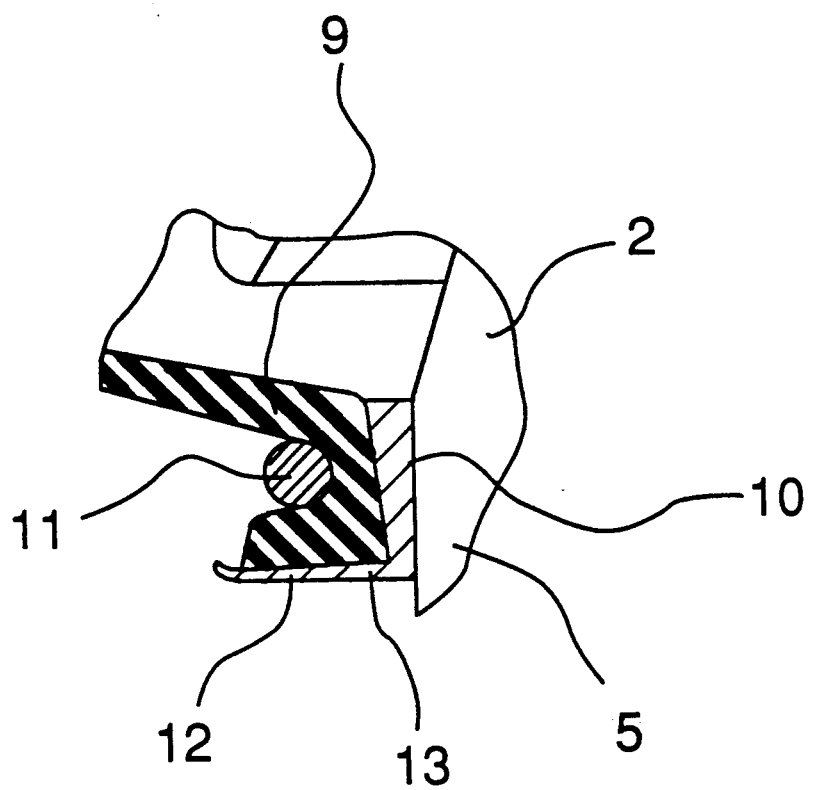

The ball joint according to the exemplified embodiment consists of the housing 1 and the ball pivot 2 which is inserted by means of a joint cup 4 into the housing 1 with a joint ball 3 provided at one of its ends. The housing 1 can be connected to a component of a motor vehicle by fastening means not recognizable in the drawing, while a shaft part 5 of the ball pivot 2 is fastened in a bearing lug 6 of another vehicle part. A sealing cuff 7 made of an elastic material, one end of which is fastened to the housing 1 and the other end of which is fastened to the ball pivot 2, is provided between the housing 1 and the ball pivot 2. The fastening on the housing side consists, for example, of a beaded edge at the end of the sealing cuff 7, which engages in a circular groove on the housing 1 and is held therein by means of one or more spring rings 8.

The other, outer end of the sealing cuff is provided with an edge profile 9 which engages in a retaining ring 10 that has an L-shaped cross section in the case of the example. The retaining ring 10 is pressed or adhered onto the inner end of the shaft part 5 or is fastened to it in another way. The edge profile 9 is also held by one or, if desired, several spring rings 11 in the recess formed by the cross section shape of the retaining ring 10. The retaining ring 10 is made of zinc or another material that has a value in the electrochemical series as compared to the material of the bearing lug 6 or the ball pivot 2 which has a lower value (i.e. the retaining ring is formed of a material which is electrochemically more reactive than the material of the bearing lug 6 and the ball pivot 2). The leg 12 of the retaining ring 10, which has an L-shaped or angular cross section and extends radially to the longitudinal axis of the ball pivot 2, is provided with the support surface 13, with which the retaining ring is supported on the edge of the bearing lug 6. The cross section of the leg 12 continuously increases from the outside to the inside, so that the height of the cross section increases from the outside to the inside. The leg 12 acts mainly in the electrochemical process for the cathodic protection of the supporting components 6 and 2, especially when salt water is in contact with the area subject to the risk of corrosion and is used as an electrolyte for cathodic protection. A height of material that increases from the outside to the inside must be removed from the sacrificial anode, so that the decomposed volume continuously increases from the outside to the inside. Instead of making the retaining ring 10 of zinc as described, a composite design is also possible, in which only the radially directed leg 12 consists of a material which provides the function of a sacrificial anode. The leg may also be coated with an appropriate material.

While a specific embodiment of the invention has been shown and described in detail to illustrate the application of the principles of the invention, it will be understood that the invention may be embodied otherwise without departing from such principles.

What is claimed is:

1. A ball joint for motor vehicles, comprising:
a housing having an outer circumference; a joint ball positioned in said housing, said joint ball having a ball pivot extending therefrom; a bearing lug, said ball pivot fastened in said bearing lug; a retaining ring rigidly arranged on said ball pivot and supported by an edge of said bearing lug; a sealing cuff formed of an elastically deformable material, one end of said sealing cuff being fastened to said circumference of said housing and another end of said sealing cuff having an edge profile rotatably engaging a complimentary profile of said retaining ring, said retaining ring being formed of a material having a higher value in the electrochemical series as compared to the material forming said bearing lug and the material forming said ball pivot which have a value in the electrochemical series which is lower than said retaining ring material value, said bearing lug material acting as an electrolytic sacrificial anode.

2. A ball joint according to claim 1, wherein said retaining ring includes a radially extending leg forming a support surface engaged with said edge of said bearing lug, said radially extending leg having a cross section dimension which increases from an outside of said retaining ring to an inside of said retaining ring.

3. A ball joint according to claim 1, wherein said retaining ring is formed of zinc.

4. A ball joint for motor vehicles, comprising:
a housing having an outer circumference; a joint ball positioned in said housing, said joint ball having a ball pivot extending therefrom; a bearing lug, said ball pivot fastened in said bearing lug; a retaining ring rigidly arranged on said ball pivot and supported by an edge of said bearing lug; a sealing cuff formed of an elastically deformable material, one end of said sealing cuff being fastened to said circumference of said housing and another end of said sealing cuff having an edge profile engaging a complimentary profile of said retaining ring; and, electrolytic sacrificial anode means formed by said retaining ring, said electrolytic sacrificial anode means including a material which is electrochemically more reactive as compared to a material forming said bearing lug and a material forming said ball pivot for acting as said electrolytic sacrificial anode.

5. A ball joint or motor vehicle comprising:
a housing; a joint ball and ball pivot element, said joint ball being positioned in said housing with said ball pivot including a ball pivot shaft extending outwardly from said housing; a bearing lug fastened to said ball pivot shaft; a retaining ring including a first leg with an inner surface rigidly connected to said ball pivot shaft and a second leg with an inner surface supported on an edge surface of said bearing lug; a sealing cuff formed of an elastically deformable material, said sealing cuff including one end fastened to an outer surface of said housing and including another end having an edge profile with a first portion engaging an outer surface of said first leg and a second portion engaging an outer surface of said second leg of said retaining ring; and, electrolytic sacrificial anode means including a material forming at least a portion of said retaining ring, said material being electrochemically more reactive than a material forming said bearing lug and a material forming said ball pivot.

6. A ball joint according to claim 4, wherein said material of said electrolytic sacrificial anode means comprises the entire material of said retaining ring.

7. A ball joint according to claim 4, wherein said material of said electrolytic sacrificial anode means comprises said first leg of said retaining ring, said first leg extending between said sealing cuff and said ball pivot.

8. A ball joint according to claim 5, wherein said material of said electrolytic sacrificial anode means comprises the material forming said second leg of said retaining ring, said second leg extending between said sealing cuff and said bearing rod, said second leg having a cross sectional dimension which increases from an outer end of said second leg to an inner portion of said second leg, said inner portion being disposed adjacent said first leg.

* * * * *